US008868045B2

(12) United States Patent
Vander Veen et al.

(10) Patent No.: US 8,868,045 B2
(45) Date of Patent: Oct. 21, 2014

(54) METHOD AND APPARATUS FOR INTERFACING TO COMMUNICATIONS MESSAGES

(75) Inventors: Raymond Vander Veen, Waterloo (CA); Harry R. Major, Waterloo (CA)

(73) Assignee: BlackBerry Limited, Waterloo (CA)

( * ) Notice: Subject to any disclaimer, the term of this patent is extended or adjusted under 35 U.S.C. 154(b) by 1143 days.

(21) Appl. No.: 10/937,001

(22) Filed: Sep. 8, 2004

(65) Prior Publication Data
US 2006/0052119 A1 Mar. 9, 2006

(51) Int. Cl.
*H04M 1/725* (2006.01)

(52) U.S. Cl.
CPC .................................. *H04M 1/72547* (2013.01)
USPC ...................... 455/412.2; 455/414.1; 455/415; 455/566; 379/201.02; 379/201.04; 379/88.12

(58) Field of Classification Search
USPC .......... 379/88.12, 201.02, 201.04; 455/412.2, 455/414.1, 415, 566
See application file for complete search history.

(56) References Cited

U.S. PATENT DOCUMENTS

| | | | | |
|---|---|---|---|---|
| 6,018,571 | A * | 1/2000 | Langlois et al. | 379/201.04 |
| 6,333,973 | B1 * | 12/2001 | Smith et al. | 379/88.12 |
| 7,103,164 | B1 * | 9/2006 | Booton | 379/201.02 |
| 7,212,808 | B2 * | 5/2007 | Engstrom et al. | 455/412.1 |
| 2002/0152220 | A1 | 10/2002 | Kang et al. | |
| 2003/0100295 | A1 * | 5/2003 | Sakai et al. | 455/415 |
| 2004/0119761 | A1 * | 6/2004 | Grossman et al. | 345/854 |
| 2004/0137955 | A1 * | 7/2004 | Engstrom et al. | 455/566 |
| 2004/0203651 | A1 * | 10/2004 | Qu et al. | 455/414.1 |
| 2004/0228531 | A1 * | 11/2004 | Fernandez et al. | 382/187 |
| 2004/0242284 | A1 * | 12/2004 | Sierawski et al. | 455/567 |
| 2005/0020316 | A1 * | 1/2005 | Mahini | 455/566 |

OTHER PUBLICATIONS

European Search Report; European Patent Office; Feb. 8, 2006; 7 pages.
Canadian Office Action in Application No. 2,518,515; Canadian Intellectual Property Office;Mar. 23, 2009; 3 pages.

* cited by examiner

*Primary Examiner* — Wayne Cai
(74) *Attorney, Agent, or Firm* — The Danamraj Law Group, P.C.

(57) ABSTRACT

A user interface system is provided for managing communications messages of a communications device supporting voice and data services. The user interface system is operative to receive a data element wherein the data element identifies the type of communications message received and sender identification, display a menu upon receiving the data element, wherein the menu comprises a selectable object with the selectable object having a label identifying the message type, receive a data item indicating selection of the selectable object and generate a communications action in response to selection of the selectable object.

12 Claims, 2 Drawing Sheets

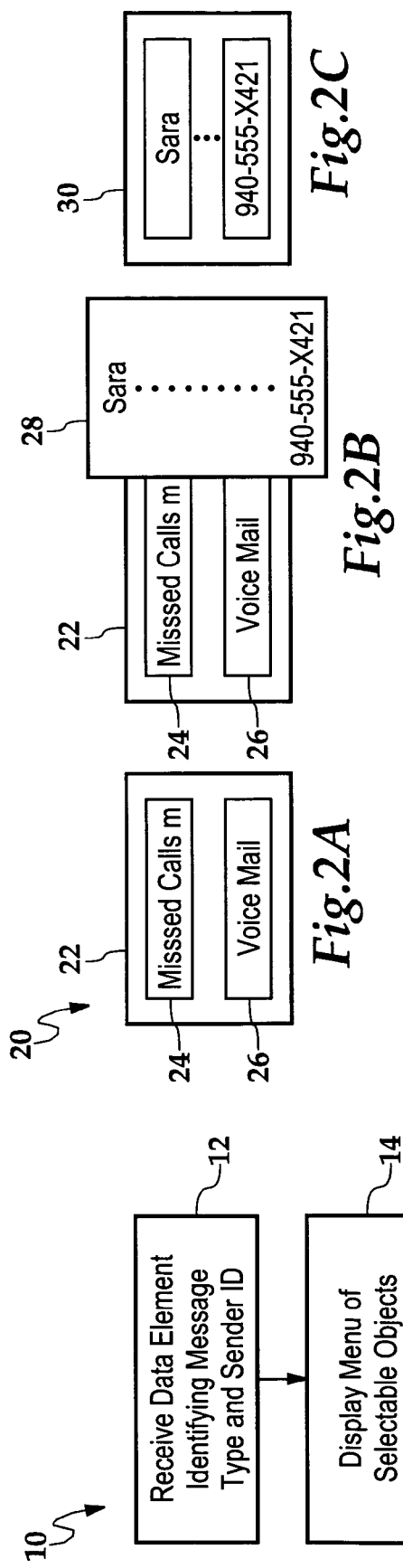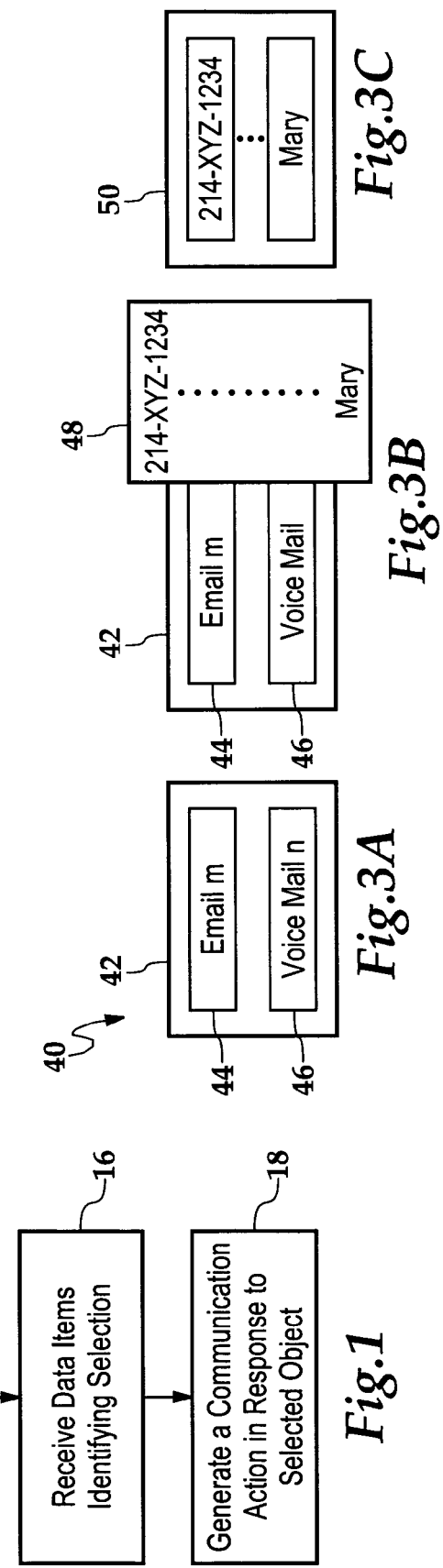

METHOD AND APPARATUS FOR INTERFACING TO COMMUNICATIONS MESSAGES

TECHNICAL FIELD

The present invention relates, in general, to the field of communications devices capable of supporting voice and data services, and, in particular, to a method and apparatus for accessing communication messages associated with the voice and data services.

BACKGROUND

Mobile communications devices supporting voice and data services provide a user access to and a user interface for a multitude of message services, such as call logs, email, Instant Messages (IM), Simple Message Service (SMS), and voice messages. Access to these services requires the mobile communications device provide a user with an interface platform capable of navigating the various messages these services provide. A user of mobile communications devices and services often use these devices and services because they are a convenient and efficient means of communication. A user interface of mobile communications device can be a distinguishing signature separating the device from other communications devices within the same market. A user interface system can either provide a user efficient and simple operational access to these services, resulting in a satisfied user, inefficient and difficult operational access to these services, resulting in an unsatisfied customer, or somewhere in between. If the user interface system providing the interface to these services is difficult to navigate, user satisfaction with the communications device may be unfavorable resulting in a less loyal customer to that particular product and company. The unification of these services requires a more sophisticated user interface to provide the user with the most efficient and simple navigation means.

Therefore, there is a need to provide enhanced user interface features for a communications device supporting voice and data services.

SUMMARY

To provide enhancements to user interface features associated with communications devices identified within the background, a method and apparatus are provided for managing communications messages.

In an embodiment, a communications device for processing and storing data and receiving communications messages is presented. The communications device is operative to receive a data element wherein the data element identifies the type of communications message received and sender identification information. The communications device is further operative to display a menu upon receiving the data element. The menu comprises at least one selectable object with the selectable object having a label identifying the message type. The communications device is further operative to receive a data item indicating selection of the selectable object. Upon receiving the data item, the communications device is further operative to generate a communications action. The communications action is dependent on the number of communications messages associated with the selectable object and the type of communications message associated with the selectable object.

In the embodiment, if only one message is associated with the selectable object, the communications device is operative upon receiving selection to either generate a communications action to display the communications message in the case the communications message is an email, IM, SMS, or any other comparable type, or connect to a voice mail system associated with the communications device. In the case multiple communications messages are associated with the selectable object, the communications device is operative upon receiving selection to either display a sub-menu comprising sender identification labels or a list comprising sender identification labels. The communications device is further operative to receiving selection of a label and to generate a communications action to either display the communications message associated with the selected label or connect to a voice mail system associated with the communications device.

BRIEF DESCRIPTION OF THE DRAWINGS

FIG. 1 illustrates a block diagram of the user interface system;

FIG. 2A illustrates an exemplary user interface comprising a menu of selectable objects as displayed on a communications device supporting voice and data services and utilizing the user interface system;

FIG. 2B illustrates an exemplary user interface comprising a sub-menu of selectable labels as displayed on a communications device supporting voice and data services and utilizing the user interface system;

FIG. 2C illustrates an exemplary user interface comprising a list of selectable labels as displayed on a communications device supporting voice and data services and utilizing the user interface system;

FIG. 3A illustrates an alternative exemplary user interface comprising an alternative menu as displayed on a communications device supporting voice and data services and utilizing the user interface system;

FIG. 3B illustrates an alternative exemplary user interface comprising a sub-menu of selectable labels as displayed on a communications device supporting voice and data services and utilizing the user interface system;

FIG. 3C illustrates an alternative exemplary user interface comprising a list of selectable labels as displayed on a communications device supporting voice and data services and utilizing the user interface system;

DETAILED DESCRIPTION

Figure 5:
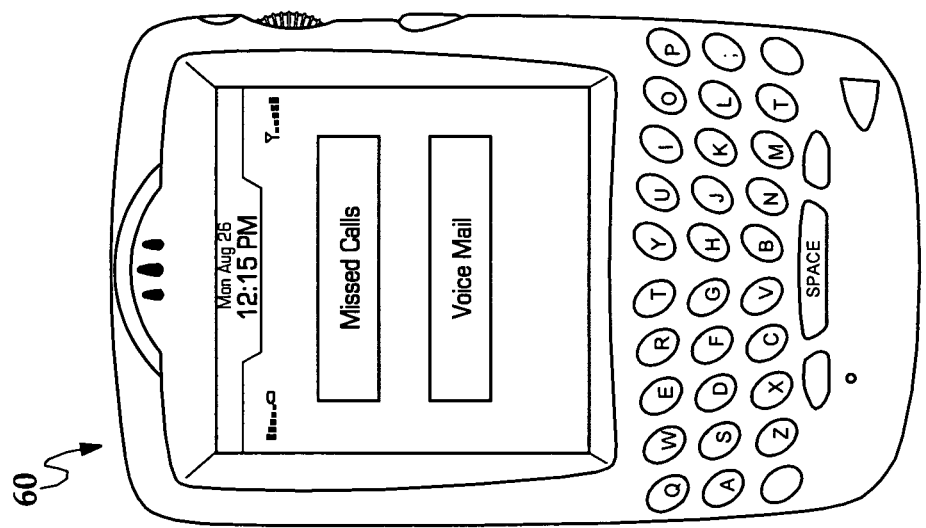
FIG. 5 illustrates a communications device utilizing the data processing mechanism for enabling the user interface system.

While the use and implementation of particular embodiments of the present invention are presented in detail below, it will be understood that the present invention provides many inventive concepts, which can be embodied in a wide variety of contexts. The specific embodiments discussed herein are merely illustrative of specific ways to make and use the invention and are not intended to limit the scope of the invention.

A user interface system for managing communications messages of a communications device for processing and storing data and capable of supporting voice and data services is presented. The user interface upon receiving a data element, wherein the data element identifies a type of communications message received, and sender identification, displays a menu comprising at least one selectable object for each message type received, wherein each selectable object comprises a label identifying the message type. Upon user selection, the user interface system displays the message associated with the selectable object if only one message is associated with the selectable object; or either displays a list or sub-menu comprising a sender identification label for each message received. If the list or sub-menu comprising the sender identification item is displayed, upon receiving a user selection the user interface system generates a communications action to display the selected message associated with the sender identification label if the communications message is an email, call log, IM, SMS messages or something equivalent; or the user interface system generates a communications action to connect to a voice mail system associated with the mobile communications device allowing access to a selected voice message if the communications message is a voice mail message. Specific information concerning how a communications device can access specific voice mail messages from a voice mail system can be obtained from pg. 12-27 of U.S. application Ser. No. 10/456,181, incorporated herein by reference.

Referring to FIG. 1, a block diagram of the user interface system for use in a communications device is illustrated and denoted generally as 10. At block 12, the user interface system receives a data element for each received communications message, such as a voice mail, a call log, an email, a Simple Mail Service (SMS), or an Instant Message (IM). The data element comprises information identifying the type of communications message received and sender identification, such as sender number or name. Additional information provided to the user interface system may include indication of attachments, and urgency of the communications. Next, block 14, the user interface system, upon receiving the data element for each communications message, displays a menu with a selectable object for each type of message received. Each selectable object comprises a label identifying the message type. In addition, the label may also include the number of a particular type of communications message received. Upon the user interface system receiving a data item indicating a selected object, block 16, the user interface system generates a communications action in response to the selected object, block 18. The generation of communications action is dependent on which message type is associated with a selected object and how many communication messages are associated with the selected object. In the case that only one message is associated with a selected object, the user interface system either generates a communications action to display the communication message if the communications message is an email, SMS, IM, call log message or any other comparable message; or if it is a voice mail message, the user interface system generates a communications action to either connect to the voice mail system associated with mobile communications device where the voice mail message resides, which requires user navigation to access the voice mail message, or connect directly to the voice mail within the voice mail system without requiring user navigation. If, however, in the case where multiple communication messages are associated with the selectable object, the user interface system either generates a communications action to display a list comprising sender identification labels for each communications message received, or a sub-menu comprising sender identification labels for each communications message received. The user interface system, in the case of selectable items in either the list or the sub-menu, may then receive another data item identifying selection. Depending on the message type associated with the item in the list or sub-menu, the interface system can generate a communications action to display the communications message associated with the selected label, in the case of email, SMS, or IM; or connect to a voice mail system, requiring user navigation, or connect directly to the voice mail within the voice mail selected within the voice mail system, which would not require user navigation.

Referring to FIGS. 2A, 2B, and 2C, exemplary user interfaces as displayed on a communications device supporting voice and data services and utilizing the user interface system as described with respect to FIG. 1 is illustrated and denoted generally as 20. The user interface in FIG. 2A comprises a menu 22 with selectable objects 24, 26. The selectable objects 24, 26 maybe labeled according to the message type. Upon receiving a communications message and according to the number of communications messages received, the user interface system displays the menu 22 with the selectable objects 24, 26, as in this example the menu 22 comprises a number, m, of missed calls and voice mail messages. In this particular example, upon the selection of the selectable object 24, the user interface system either displays a call log associated with a missed call if only one missed call is received, or in the case multiple missed calls are received, a sub-menu 28, as illustrated in FIG. 2B, comprising sender identification labels, such as an identification number or name, associated with each communications messages received, or a list 30, as illustrated in FIG. 2C, comprising sender identification labels, again such as number or name identification, associated with each communications message received. In addition, other information may be included along with sender identification information, such as time, date, urgency, and attachment indication. The user interface system may then receive a data item identifying selection of one of the sender identification labels resulting in the user interface system generating a communications action to display a call log associated with the selected label. The call log may comprise information such as time, date, and sender identification information. Also in this particular example, upon the selection of selectable object 26, the user interface system generates a communications action to connect to the voice mail system associated with the communications device allowing the user to navigate the voice mail system to obtain voice mail messages. Once the communications message has been accessed by the user, the interface system receives a data item indicating such action and removes the associated information from the information associated with received communications messages.

Referring to FIGS. 3A, 3B, and 3C, another exemplary user interfaces as displayed on a communications device supporting voice and data services and utilizing the user interface system as described with respect to FIG. 1 is illustrated and denoted generally as 40. The user interface in FIG. 2A comprises a menu 42 with selectable objects 44, 46. The selectable objects 44, 46 are labeled according to the message type, and may also include a number indicating the number of communications messages received. Upon receiving a communications message and according to the number of communications messages received, the user interface system displays the menu 42 with the selectable objects 44, 46. As in this example, the menu 42 comprises the selectable object 44 having an email label and a number, m, indicating the number of emails received, and the selectable object 46 having a voice mail label and a number, n, indicating the number of voice mails received. In the case selectable object 44 is selected, the user interface system either displays the email message in the case only one email message was received; or displays a sub-menu 48, as illustrated in FIG. 3B, or a list 50, as illustrated in FIG. 3C, comprising sender identification labels for each of the received communications messages. The user interface system may then receive a data item identifying selection of one of the sender identification labels resulting in the user interface system generating a communications action to display the selected email. In the case selectable object 46 is selected, either the user interface system generates a communications action to connect directly a voice mail message of a voice mail system associated with the communications device in the case only one voice mail received; or, in the case more than one voice mail message received, display either a sub-menu 48 comprising scrollable and selectable labels one for each voice mail message received, or a list 50 comprising scrollable and selectable labels one for each voice mail message received. Upon the user interface system receiving a data item identifying label selection, the user interface system generates a communications action to connect to the selected voice mail system associated with the communications device without requiring navigation. Once the communications message has been accessed by the user, the interface system receives a data item indicating such action and removes the associated information from the information associated with received communications messages.

Figure 4:
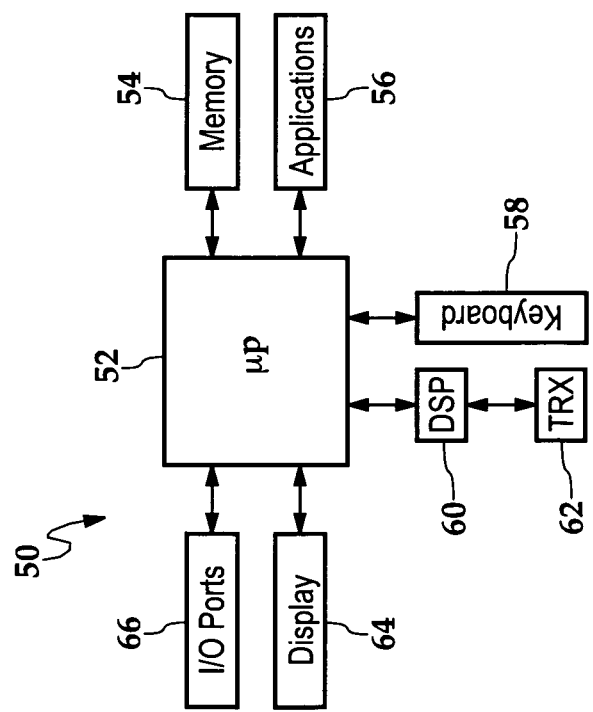
FIG. 4 illustrates a data processing mechanism for enabling the user interface system.

Referring now to FIG. 4, a data processing mechanism for enabling the user interface system 10 is illustrated and denoted generally as 50. Data processing mechanism 50 comprises a processor 52 for executing instructions, a memory 54 for storing information, an applications module 56 for storing software applications, such as the user interface system 10, at least one Input output I/O port 58 for peripherals, for example for a keyboard, a microphone, speaker, a USB port, a scrolling means, such as a scroll wheel, a scroll switch, or a scroll strip, each scrolling means may comprise a selectable action feature. The Data processing mechanism 50 further includes a Digital Signal Processor (DSP) 60 for interfacing communication messages between a transceiver mechanism 62 and the microprocessor 52. The data processing mechanism 50 may be utilized in a mobile communications device 60, as illustrated in FIG. 5, capable of accessing wireless communication services, such as W-CDMA, CDMA2000, CDMA1X DO, CDMA 1X DV, EDGE, GPRS, W-LAN, W-FI, GSM, or any other wireless communications interface capable of delivering voice and data services.

Although the illustrated Figures provide a couple of examples for managing a number of communications messages, it should be understood that the number and type of selectable objects can vary depending on the communications messages received and that the number of communication messages associated with a selectable object can vary also depending on the communications received. The interface system could also modify the size format of the selectable objects or provide means of scrolling to navigate the selectable objects if the number of selectable objects exceeds a viewable size of a display. It should also be understood that the methods and mechanisms used to access a particular voice mail of a voice mail systems are the subject of another pending patent application held by the same Assignee and incorporated herein by reference.

While the use and implementation of particular embodiments of the present invention are presented in detail below, it will be understood that the present invention provides many inventive concepts, which can be embodied in a wide variety of contexts. The specific embodiments discussed herein are mere illustrations of specific ways for making and using the invention and are not intended to limit the scope of the invention.

What is claimed is:

1. A method of operating a mobile communications device, the method comprising:

receiving a communications message, the message comprising information relating to message type and sender identification;

directly responsive to receiving the communications message, displaying a selectable menu, the menu comprising at least a first object having a first label and a second object having a second label, the first label identifying a first communications message type and a first number of messages of the first communications message type and the second label identifying a second communications message type and a second number of messages of the second communications message type;

receiving a data element indicating a user's selection of one of the first and second objects; and generating a communications action to display a scrollable and selectable list of sender identifications relating to a plurality of communications messages from a plurality of senders for the object selected by the user.

2. The method according to claim 1, further comprising receiving a user's selection of one of the sender identifications relating to the plurality of communications messages and displaying a list of communications messages from the selected sender identification.

3. The method according to claim 2, further comprising receiving a user's selection of one of the communications messages and displaying the selected communications message.

4. The method according to claim 2, further comprising receiving a user's selection of one of the sender identifications relating to the plurality of communications messages and connecting to a voicemail message associated with the selected sender identification.

5. The method according to claim 2, further comprising receiving a user's selection of one of the sender identifications relating to the plurality of communications messages and connecting to a voicemail system upon receiving the selection.

6. The method according to claim 1, wherein the communications message is selected from the group consisting of a call log, a Simple Message Service (SMS) message, an Instant Message (IM), and an email message.

7. A communications device comprising:

a processor configured to control at least one of a plurality of sub-systems for communicating with a network node;

the processor further configured to control at least one of the plurality of sub-systems for receiving a communications message, the message comprising information relating to message type and sender identification;

the processor further configured to control at least one of the plurality of sub-systems for displaying a selectable menu directly responsive to receiving the communications message, the menu comprising at least a first object having a first label and a second object having a second label, the first label identifying a first communications message type and a first number of messages of the first communications message type and the second label identifying a second communications message type and a second number of messages of the second communications message type;

the processor further configured to control at least one of the plurality of sub-systems for receiving a data item indicating a user's selection of one of the first and second objects; and the processor further configured to control at least one of the plurality of sub-systems for generating a communications action comprising displaying a scrollable and selectable list of sender identifications relating to a plurality of messages from a plurality of senders for the object selected by the user.

8. The communications device according to claim 7, wherein the processor is further configured to control at least one of the plurality of sub-systems for receiving a user's selection of one of the sender identifications relating to the plurality of communications messages and displaying a list of communications messages from the selected sender identification.

9. The communications device according to claim 8, wherein the processor is further configured to control at least one of the plurality of sub-systems for receiving a user's selection of one of the communications messages and displaying the selected communications message.

10. The communications device according to claim 8, wherein the processor is further configured to control at least one of the plurality of sub-systems for receiving a user's selection of one of the sender identifications relating to the plurality of communications messages and connecting to a voicemail message associated with the selected sender identification.

11. The communications device according to claim 8, wherein the processor is further configured to control at least one of the plurality of sub-systems for receiving a user's selection of one of the sender identifications relating to the plurality of communications messages and connecting to a voicemail system upon receiving the selection.

12. The method according to claim 7, wherein the communications message is selected from the group consisting of a call log, a Simple Message Service (SMS) message, an Instant Message (IM), and an email message.

* * * * *